United States Patent
Mackie et al.

(10) Patent No.: US 11,072,890 B2
(45) Date of Patent: Jul. 27, 2021

(54) BROWN STOCK WASH CONTROL

(71) Applicant: Ecolab USA Inc., St. Paul, MN (US)

(72) Inventors: Karry Mackie, St. Johns, FL (US); Jon Clegg, Maggie Valley, NC (US); Joseph Konopa, Anderson, SC (US); John H. Thomas, Sangerville, ME (US)

(73) Assignee: ECOLAB USA INC., St. Paul, MN (US)

( * ) Notice: Subject to any disclaimer, the term of this patent is extended or adjusted under 35 U.S.C. 154(b) by 587 days.

(21) Appl. No.: 15/854,432

(22) Filed: Dec. 26, 2017

(65) Prior Publication Data

US 2018/0187376 A1    Jul. 5, 2018

Related U.S. Application Data

(60) Provisional application No. 62/440,902, filed on Dec. 30, 2016.

(51) Int. Cl.
| | | |
|---|---|---|
| *D21H 23/06* | (2006.01) | |
| *B01D 19/04* | (2006.01) | |
| *D21H 21/12* | (2006.01) | |
| *D21C 9/02* | (2006.01) | |
| *D21H 21/10* | (2006.01) | |
| *B01D 19/00* | (2006.01) | |

(52) U.S. Cl.
CPC ......... *D21H 23/06* (2013.01); *B01D 19/0063* (2013.01); *B01D 19/0409* (2013.01); *D21C 9/02* (2013.01); *D21H 21/10* (2013.01); *D21H 21/12* (2013.01)

(58) Field of Classification Search
CPC ........ D21H 23/06; D21H 21/10; D21H 21/12; D21C 9/02
See application file for complete search history.

(56) References Cited

U.S. PATENT DOCUMENTS

| | | | |
|---|---|---|---|
| 4,207,141 A | | 6/1980 | Seymour |
| 4,624,745 A | † | 11/1986 | Sande |
| 4,700,561 A | | 10/1987 | Dougherty |
| 4,732,651 A | | 3/1988 | Lisnyansky et al. |
| 5,282,131 A | | 1/1994 | Rudd et al. |
| 5,641,385 A | | 6/1997 | Croft et al. |
| 5,932,792 A | | 8/1999 | Dougherty |
| 6,074,522 A | † | 6/2000 | Seymour |

(Continued)

FOREIGN PATENT DOCUMENTS

WO    WO 2015/119771 A1    8/2015

OTHER PUBLICATIONS

Bender et al., "Advanced Control for Brown-Stock Washers," *TAPPI Journal*, 1988, pp. 115-118.

(Continued)

*Primary Examiner* — Jacob T Minskey
(74) *Attorney, Agent, or Firm* — Eric D. Babych; Barnes & Thornburg LLP

(57) ABSTRACT

Methods of and systems for controlling dosing of drainage aid and optionally defoamer to brown stock of a brown stock washing process are provided. Certain embodiments of the invention provide independent control of drainage aid and/or defoamer to brown stock, which tends to provide improved efficiency in dosing each of the drainage aid and the defoamer.

16 Claims, 3 Drawing Sheets

(56) References Cited

U.S. PATENT DOCUMENTS

| | | | |
|---|---|---|---|
| 6,162,325 | A | 12/2000 | Raslack et al. |
| 6,450,006 | B1 | 9/2002 | Dougherty |
| 6,511,611 | B2 | 1/2003 | Temple et al. |
| 7,964,064 | B2 | 6/2011 | Weinstein et al. |
| 9,371,613 | B1 † | 6/2016 | Lobo |

OTHER PUBLICATIONS

Mirza et al., "Foam and Entrained Air Management: A Practical Perspective," Chpt. 4 of *Applications of Wet-End Paper Chemistry*, 2nd ed., Dordrecht, Springer, 2009, pp. 53-72.

Van Fleet, Brown Stock Washing Optimization Using Sensor Based Control—Part I Overview, 1999 TAPPI Proceedings, Joint Conference Process Control, Electrical and Information Conference ISA Pupid 38th Annual Symposium, Mar. 16-19, 1998, TAPPI Press, Atlanta, GA, pp. 1-8.

Wang et al., "New Insights into Dispersed Air Effects in Brownstock Washing," *TAPPI Journal*, 84(1), Jan. 2001, p. 101.

Horton et al., "Practical Experience with On-Line Entrained Air Testing and Defoamer Control," 2007 TAPPI Papermakers and PIMA International Leadership Conference, 30 pp. (Mar. 11, 2007).

Anonymous, Third-Party Observations in U.S. Appl. No. 15/854,432, 32 pp. (Apr. 22, 2019).

Anonymous, Third-Party Observations in International Patent Application No. PCT/US2017/068422, 30 pp. (Apr. 25, 2019).

European Patent Office, International Search Report in International Patent Application No. PCT/US2017/068422, dated Mar. 15, 2018.

European Patent Office, Written Opinion in International Patent Application No. PCT/US2017/068422, dated Mar. 15, 2018.

Mirza et al., "Foam and Entrained Air Management: A Practical Perspective," Applications of Wet-End Paper Chemistry, by Ian Thorn, Springer 2014, pp. 53-72.†

Horton et al., Practical Experience with On-Line Entrained Air Testing and Defoamer Control, 2007 TAPPI Papermakers and PIMA International Leadership Conference: Mar. 11-15, 2007, Jacksonville, Florida, USA.†

† cited by third party

BROWN STOCK WASH CONTROL

This application is a nonprovisional application claiming the benefit of U.S. Provisional Patent Application Ser. No. 62/440,902, filed Dec. 30, 2016, the disclosure of which is incorporated herein by reference in its entirety.

BACKGROUND OF THE INVENTION

Generally, entrained air impacts brown stock washer operation and, therefore, wash aid consumption. Control of wash aids (e.g., drainage aid, defoamer) to a brown stock washing process ranges from manual control where pump flows are changed at a single wash aid pump with no higher level (e.g., feedback) control, to other control systems that utilize only measured entrained air data to control dosing of a single, pre-blended wash aid.

Many brown stock washing processes utilize manual control. For these processes, pumps are set manually at a given flow rate and have no interface with the brown stock washing process. Generally, chemical feed rates are constant until the operator manually alters the pump speed, and therefore the flow rate. In some cases, changes in flow rate will be made during upset conditions and left at the changed flow rate for an extended (i.e., excessive) period of time.

Another control method that is commonly utilized in brown stock washing processes is simple "pounds per ton" control, i.e., pounds of wash aid dosed per ton of dry pulp. For "pounds per ton" processes, the brown stock washing process control system calculates a pounds-of-wash-aid-per-ton-of-dry-pulp set point and then controls washing aid dosage based on the setpoint. "Pounds per ton" control does not base its wash aid dosage control on changes in either measured entrained air concentration data or changes in fiber characteristics that may impact drainage.

A rarely-used method of brown stock washing process control involves controlling defoamer dosage to maintain a set washer drum speed.

BRIEF SUMMARY OF THE INVENTION

A method of controlling dosage of drainage aid to brown stock of a brown stock washing process is provided. The method comprises dosing the drainage aid to brown stock according to at least two variables: brown stock washer drum speed and brown stock washer stock flow. The drainage aid is dosed according to a comparison of the brown stock washer drum speed to the brown stock washer stock flow.

Additionally, a method of controlling dosage of drainage aid and defoamer to brown stock of a brown stock washing process is provided. The method comprises dosing the drainage aid and the defoamer to brown stock according to at least three variables: measured entrained air concentration of the brown stock, brown stock washer drum speed, and brown stock washer stock flow. The drainage aid is dosed according to a first comparison of the brown stock washer drum speed to the brown stock washer stock flow. The defoamer is dosed according to a second comparison of the measured entrained air concentration of the brown stock to a setpoint.

A system for controlling dosing of drainage aid and defoamer to a brown stock washing process is provided. The system comprises an entrained air concentration measurement device, a brown stock washer drum speed relay, a brown stock washer stock flow rate measuring device, a controller, a drainage aid delivery unit, and a defoamer delivery unit. The controller is configured to receive data provided by the entrained air measurement device, the brown stock washer drum speed relay, and the brown stock washer stock flow rate measuring device and transform the data into drainage aid output instructions and defoamer output instructions. The drainage aid deliver unit is configured to receive and execute the drainage aid output instructions from the controller. The defoamer delivery unit is configured to receive and execute the defoamer output instructions from the controller.

DETAILED DESCRIPTION OF THE INVENTION

Figure 1:
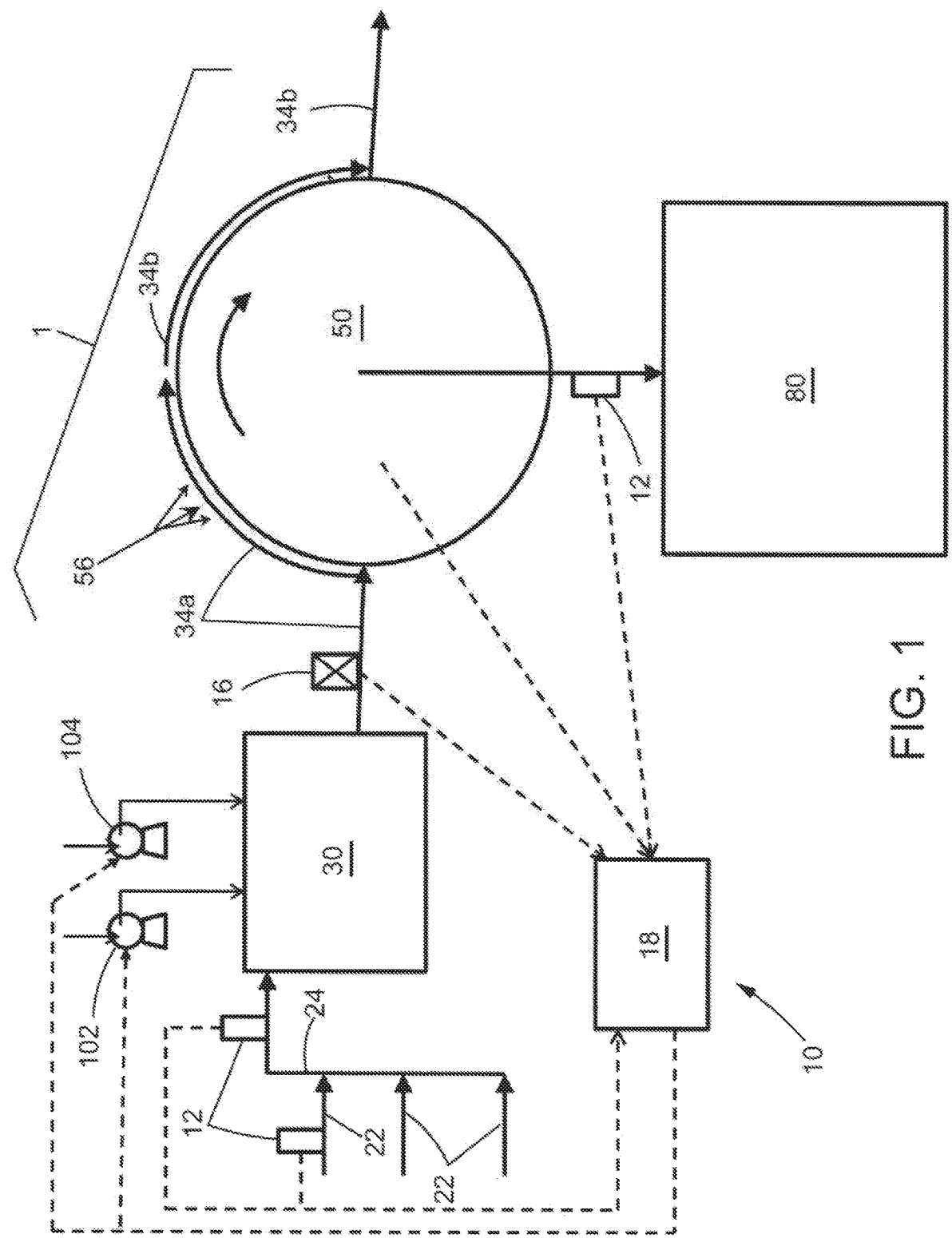
FIG. 1 shows a schematic diagram of an embodiment of a brown stock washing process comprising a system of the present disclosure that can be utilized for carrying out the methods of the present disclosure.

Entrained air present in the brown stock does not always affect brown stock washing efficiency. It has been discovered that, in addition to entrained air present in brown stock, brown stock washing efficiency can be affected by surface tension characteristics in the brown stock instead of or in addition to the presence of entrained air in the brown stock. Independently dosing drainage aid and defoamer to pulp in a brown stock washing process provides flexibility over having a pre-blended, combined drainage aid-defoamer treatment. Dosing drainage aid and defoamer according to the methods provided herein is intended to allow the brown stock washing process to adjust dosage of each of drainage aid and defoamer as needed in real time, which should thereby provide for consistent pulp quality and runnability of not only the brown stock washing process but also of a downstream papermaking process.

A method of controlling dosage of drainage aid, defoamer, or both drainage aid and defoamer to pulp in a brown stock washing process is provided. In certain embodiments, the method comprises independently dosing the drainage aid and the defoamer to the brown stock washing process according to at least three variables: (1) measured entrained air concentration of the brown stock, (2) brown stock washer drum speed, and (3) brown stock washer stock flow. The drainage aid is dosed according to a first linear control formula depending on a comparison of the brown stock washer drum speed to the brown stock washer stock flow. The defoamer is dosed according to a second linear control formula depending on a comparison of the measured entrained air concentration of the brown stock to a setpoint.

The methods and systems described herein are related to treatment of brown stock. The term "brown stock" is a term of art that refers to a slurry comprising generally unbleached pulp that is fed to a brown stock washer. Brown stock comprises pulp and water (i.e., pulp slurry), and may further comprise, for example, black liquor solids present due to countercurrent washing. Generally, brown stock is washed to remove solids (e.g., black liquor solids) from the unbleached pulp prior to, for example, bleaching the pulp and/or feeding the pulp to a papermaking process, and to reduce conductivity of the pulp mat to improve efficiency of downstream bleaching. Additionally, brown stock washing helps reduce soda loss in brown stock processing, which generally promotes efficiency in processing as related to soda consumption.

Generally, brown stock washing is performed via a brown stock washing process that comprises a brown stock washer stock being delivered (e.g., flowed) to a brown stock washer drum rotating at a brown stock washer drum speed. The brown stock washer stock comprises pulp slurry, and the pulp slurry is taken up by the rotating brown stock washer drum. Treatment in the form of, among others, drainage aid, defoamer, or both drainage aid and defoamer are delivered to the pulp slurry via one or more pumps. The brown stock washing process may be performed in stages (e.g., delivery of one treatment, followed by delivery of a second treatment that may be the same or different) on a plurality of brown stock washer drums. The brown stock washing process may be repeated one or more times. Generally, after completing the brown stock washing process, the pulp slurry proceeds to a bleaching plant for bleaching. In certain embodiments of the methods provided herein, the brown stock is washed so as to minimize bleaching costs (e.g., minimize chlorine dioxide consumption and/or hydrogen peroxide consumption).

Generally, drainage aid is dosed to the brown stock washing process so that the washed pulp will have improved drainage properties during papermaking. The improved drainage properties are imparted to the pulp by reducing the surface tension of the water in the pulp slurry. As is known in the art, pulp being formed into paper must be reasonably wet in order to form a sheet. A sheet is formed at the wet end of a papermaking process, which then passes to the dry end of the process. Once a sheet is formed at the wet end of the papermaking process, it is preferred to remove as much water as possible in the wet press section prior to the dryer section. Removal of water in the wet press section prior to the steam-heated rollers of the dryer section allows the paper machine to run faster, thereby improving energy efficiency of the papermaking process.

The drainage aid dosed to pulp of the brown stock washing process can be any suitable drainage aid. Generally, the presence of drainage aid in the pulp allows for improved drainage of water from the sheet in the wet press section as compared to pulp lacking drainage aid. In certain embodiments of the methods provided herein, the drainage aid comprises a surfactant, a defoamer as described herein, a solvent, or combinations thereof. Examples of surfactants include, but are not limited to, nonionic surfactants and anionic surfactants, e.g., ethyleneamines (e.g., ethylenediamine, diethylenetriamine, triethylenetetramine, tetraethylenepentamine, piperazine, aminoethylpiperazine, ethyleneamine mixtures such as mixtures of ethyleneamine oligomers, etc.). In certain embodiments of the methods provided herein, the solvent is suitable for removing lignin and/or other black liquor components, and is at least partially soluble or dispersible. Examples of such solvents include, but are not limited to, alcohols, ketones, heterocyclic compounds, polyethers, and the like, and mixtures thereof. Additionally, water may be utilized. In certain embodiments of the methods provided herein, the drainage aid comprises a polydimethylsiloxane ("PMDS")-containing composition.

In certain embodiments of the methods and systems provided herein, the dosing of the drainage aid is controlled via manipulation of a drainage aid delivery unit, e.g., a variable speed pump. For example, drainage aid can be dosed to the brown stock washing process via a variable speed pump. The methods and systems provided herein can be utilized to control the speed of the drainage aid variable speed pump.

Defoamer is dosed to pulp in the brown stock washing process so that entrained air can be released from the treated water in the pulp slurry. Generally, entrained air concentration should be minimized in the brown stock washing process, and in the papermaking process in general.

The defoamer dosed to pulp of the brown stock washing process can be any suitable defoamer. Generally, the presence of the defoamer in the process will allow for reduction of entrained air in the treated water present in the pulp slurry of the brown stock washing process. In certain embodiments of the methods provided herein, the defoamer is selected from a hydrocarbon, an oil, a fatty alcohol, a fatty ester, a fatty acid, a poly(alkylene oxide) (e.g., poly(ethylene oxide) or poly(propylene oxide), derivatives thereof, and copolymers thereof), an organic phosphate, hydrophobic silica (e.g., hydrophobic silica present in a hydrocarbon oil), a silicone-containing compound, and combinations thereof. In certain embodiments of the methods provided herein, the defoamer comprises a silicone-containing compound, and in certain embodiments, the silicone-containing compound is a polydimethylsiloxane ("PMDS")-containing compound. In certain embodiments of the methods provided herein, the defoamer formulation is custom-determined onsite depending on one or more of several possible variables, including, for example, drainage aid chemistry, drainage aid concentration, and combinations thereof.

In certain embodiments of the methods and systems provided herein, the dosing of the defoamer is controlled via manipulation of a defoamer delivery unit, e.g., a variable speed pump. For example, defoamer can be dosed to the brown stock washing process via a variable speed pump. The methods and systems provided herein can be utilized to control the speed of the defoamer variable speed pump.

Several variables can be monitored in the brown stock washing process, each variable providing information related to the state of the process. For example, operators of a brown stock washing process may monitor brown stock washer drum speed and/or brown stock washer stock flow to determine how quickly (or alternately, how slowly) the pulp of the brown stock washing process is being washed. A typical operator of a brown stock washer process may not utilize the retrieved data to control the process, but merely collect the data to provide information as to the general production of washed pulp.

Certain embodiments of the methods provided herein utilize the brown stock washer drum speed, the brown stock washer stock flow, and/or entrained air measurements to independently dose drainage aid and defoamer to pulp of the brown stock washing process. In embodiments of the inventive methods, the data gathered is used at least in part to control dosage of drainage aid, defoamer, or both drainage aid and defoamer.

An excessive amount of entrained air present in the pulp slurry can cause difficulty downstream from the brown stock washing process. For example, as entrained air forms in the washer vat or on the washer mat, drainage of the filtrate through the washer mat can be impacted. In addition, foam can grow rapidly without defoamer being dosed to the pulp slurry of the brown stock washing process, which can result in the foam causing overflow of the washer vat and/or filtrate tanks. Furthermore, cavitation of process pumps can be caused by the presence of excess entrained air in the pulp slurry.

Entrained air can be measured, for example, via an entrained air measurement device. An example of an entrained air measurement device is a PULSE))))AIR entrained air detection system, available from Nalco Water, 1601 West Diehl Road, Naperville, Ill. 60563. In certain embodiments of the methods provided herein, defoamer is dosed to the pulp of the brown stock washing process such that the measured entrained air is maintained at from 0 to about 20% of saturation based on mill conditions. While the aforementioned setpoint is one example of a setpoint, the term "setpoint" should be construed to include any control value or control range where a measurement (e.g., measured entrained air) is compared to a preselected or calculated control value or range thereof.

Generally, brown stock washer drum speed is monitored as part of the brown stock washing process. A brown stock washer drum is generally cylindrical, having a diameter of from about 8 ft to about 15 ft, and a length of from about 10 ft to about 40 ft, providing a drum surface of from about 250 $ft^2$ to about 2000 $ft^2$ for pulp to contact. A brown stock washing process may have a brown stock washer drum speed of from about 1 rpm to about 5 rpm, or from about 1 rpm, or from about 2 rpm, to about 4 rpm, or to about 5 rpm.

Generally, brown stock washer stock flow is monitored as part of the brown stock washing process. Brown stock washer stock flow refers to the amount of pulp slurry that is being delivered to the brown stock washer drum. Ideally, brown stock washer stock flow is maintained at a rate that is optimal to maximize production while maintaining cost efficiency. Generally, brown stock washer stock flow is maintained so as to provide a brown stock consistency of from about 1% to about 4%, including to about 3.5%. "Brown stock consistency" is a percentage rating describing the amount of pulp in the brown stock slurry. A method for calculating brown stock consistency is as follows: (oven-dry weight of pulp*100)/(weight of pulp including water). Pulp can be oven-dried, e.g., by heating pulp to 105° C. until any water has been evaporated away.

The measured brown stock washer drum speed and brown stock washer stock flow can be compared to determine dosage of drainage aid to pulp in a brown stock washing process. Utilizing the methods provided herein, a setpoint related to brown stock washer drum speed based on brown stock washer stock flow can be determined. The brown stock washer drum speed is compared with the setpoint to determine the drainage aid dosage. If the drum speed is higher than the setpoint, which is based on the stock flow, then the drainage aid dosage is increased accordingly, or vice versa for situations where the drum speed is lower than the setpoint.

In certain embodiments of the methods provided herein, the comparison of the brown stock washer drum speed and the brown stock washer stock flow is performed using a first linear control formula. In certain embodiments of the methods disclosed herein, the first linear control formula is Formula A:

$$dad=m_1*\{DS-[(m_2*SF)+b_2]\}+b_1 \qquad \text{Formula A,}$$

wherein dad=drainage aid dosage, for example, in milliliters per minute (mL/min), $m_1$=a first slope, which, in certain embodiments utilizing the exemplary units of measurement, is from 0 to about 100, DS=brown stock washer drum speed, for example, in percent of maximum speed (%), $m_2$=a second slope, which, in certain embodiments utilizing the exemplary units of measurement, is from 0 to about 100, SF=brown stock washer stock flow, for example, in gallons per minute (gal/min), $b_1$=a first offset, which, in certain embodiments utilizing the exemplary units of measurement, is from 0 to about 50, and $b_2$=a second offset, which, in certain embodiments utilizing the exemplary units of measurement, is from about 1 to about 5.

In certain embodiments of the methods disclosed herein, the comparison of the measured entrained air concentration to a setpoint is performed using a second linear control formula. In certain embodiments of the methods disclosed herein, the second linear control formula is Formula B:

$$dd=m_3*(mEA-sp)+b_3 \qquad \text{Formula B,}$$

wherein dd=defoamer dosage, for example, in milliliters per minute (mL/min), $m_3$=a third slope, which, in certain embodiments utilizing the exemplary units of measurement, is from about 1 to about 10, mEA=measured entrained air, for example, in percentage of maximum entrained air (%), sp=setpoint, and $b_3$=a third offset, which, in certain embodiments utilizing the exemplary units of measurement, is from 0 to about 40.

The values of the variables, slopes, and offsets present in Formulae A and B are exemplary in nature. A person of ordinary skill in the art will recognize that the units of the variables of Formulae A and B may be altered, with corresponding alterations of the slopes and offsets, without departing from the spirit of the formulae.

Additional variables of a brown stock washing process that may be monitored include, but are not limited to, vat level, shower flow, shower conductivity, electrical current of the drum thickener, entrained air bubble size, and combinations thereof. The linear control formulae described herein may be manipulated to account for any one, combination of, or all of the aforementioned additional variables. For example, as bubble size of entrained air increases, the impact on drainage and runnability in the brown stock washing process decreases. Estimates of bubble size of entrained air can be obtained via an entrained air measurement device as described herein, with relative bubble size being a function of standard deviation of measured entrained air. Generally, for brown stock washing, relatively large numbers for bubble size (e.g., greater than about 5%) are better for drainage, as relatively large numbers indicate coalescence of relatively small bubbles into relatively large bubbles, thereby having less impact on drainage of the washed brown stock.

In certain embodiments of the methods, the pulp has relatively high consistency (e.g., greater than about 4%), which can impact drainage in the brown stock washing process and increase conductivity of the washed brown stock. Relatively high conductivity of the pulp can result in inefficient bleaching downstream from the brown stock washing process. Additionally, changes in charge of the pulp on the paper machine may take place, impacting drainage on the paper machine. The methods provided herein generally allow for pulp of relatively low conductivity across a range of consistency levels to be utilized in papermaking because consistent brown stock washing tends to provide consistent brown stock, which tends to improve bleaching and papermaking efficiency downstream.

In certain embodiments of the methods, the method further comprises increasing the brown stock washer drum speed to prevent overflow of a washer vat of the brown stock washing process. Generally, as the brown stock drum runs more quickly, more pulp slurry is pulled onto the mat, thereby reducing the vat level.

In certain embodiments of the methods, the method further comprises controlling shower flow of the papermaking process according to drainage aid dosage. With improvement in drainage of the pulp, more shower water can be added for better washing. As vat dilution increases, the displacement of washing improves, thereby improving efficiency of the brown stock washing process.

In certain embodiments of the methods provided herein, the methods further comprise altering the second linear control formula to account for measured shower conductivity, thereby controlling defoamer dosage according to measured entrained air concentration and measured shower conductivity. In certain embodiments of the methods provided herein, shower conductivity can correlate with measured entrained air.

A system for controlling dosing of drainage aid and defoamer to a brown stock washing process is provided. The system comprises an entrained air measurement device; a brown stock washer drum speed relay; a brown stock washer stock flow rate measuring device; a controller configured to receive data provided by the entrained air measurement device, the brown stock washer drum speed relay, and the brown stock washer stock flow rate measuring device and transform the data into a drainage aid output instructions and a defoamer output instructions; a drainage aid delivery unit configured to receive and execute the drainage aid output instructions from the controller; and a defoamer delivery unit configured to receive and execute the defoamer output instructions from the controller.

FIG. 1 is a schematic illustration of a brown stock washing process 1 comprising an embodiment of a system 10 for controlling dosing of drainage aid and defoamer to a brown stock washing process. System 10 of FIG. 1 comprises entrained air measurement devices 12 (three shown, though one, two, three, or more may be utilized); brown stock washer drum speed relay 14; brown stock washer stock flow rate measuring device 16; controller 18 configured to receive data provided by the entrained air measurement devices 12, the brown stock washer drum speed relay 14, and the brown stock washer stock flow rate measuring device 16 and transform the data into a drainage aid output instructions and a defoamer output instructions; drainage aid delivery unit 102 configured to receive and execute the drainage aid output instructions from the controller; and a defoamer delivery unit 104 configured to receive and execute the defoamer output instructions from the controller. Drainage aid delivery unit 102 and defoamer delivery unit 104, as shown in FIG. 1, are configured to deliver drainage aid and defoamer to brown stock inlet vat 30, though over configurations are envisioned.

As shown in FIG. 1, brown stock washing process 1 comprises inlet vat lines 22, inlet vat header 24, and brown stock inlet vat 30, which feeds mat 34a onto rotating drum 50. Mat 34a is washed via shower 56, thereby forming washed mat 34b. Vacuum is drawn on rotating drum 50 via filtrate tank 80, and mat 34b is removed from rotating drum 50, which can be fed to another brown stock washing process 1, to a papermaking system, or to a holding apparatus.

The entrained air measurement device of the systems and methods is capable of measuring entrained air concentration in a liquid or slurry and relay information related to entrained air to a controller. In certain embodiment of the systems and methods described herein, the entrained air concentration measurement device can measure entrained air concentration in a pulp slurry (e.g., brown stock) to a concentration of from 0% to about 20% at conditions present in a brown stock washing process. The entrained air concentration measurement device may be operably connected to at least one of an inlet vat line, an inlet vat header, and a filtrate (e.g., a front filtrate). As described herein, an example of an entrained air measurement device is a PULSE))))AIR entrained air detection system, available from Nalco Water, 1601 West Diehl Road, Naperville, Ill. 60563.

The brown stock washer drum speed relay provides the controller with information related to brown stock washer drum speed. The data provided by the brown stock washer drum speed may be utilized, for example, to provide input into controlling dosage of drainage aid to the brown stock. In certain embodiments of the systems and methods provided herein, the brown stock washer drum speed relay provides an electrical input to the controller relative to the drum speed, which is then utilized in Formula A provided herein.

The brown stock washer stock flow rate measuring device provides the controller with information related to brown stock washer stock flow rate. The data provided by the brown stock washer stock flow rate measuring device may be utilized to, for example, provide input into controlling dosage of drainage aid to the brown stock. In certain embodiments of the systems and methods provided herein, the brown stock washer stock flow rate measuring device provides an electrical input to the controller relative to the brown stock washer stock flow rate, which is then utilized in Formula A provided herein.

The controller of the systems and methods provided herein is configured to receive data provided by, for example, the entrained air measurement device, the brown stock washer drum speed relay, the brown stock washer stock flow rate measuring device, and optionally other data-generating devices that may measure any one or combination of vat level, shower flow, shower conductivity, electrical current of the drum thickener, and entrained air bubble size. The controller is further configured to transform the data received from the entrained air measurement device, the brown stock washer drum speed relay, the brown stock washer stock flow rate measuring device, and optionally other data-generating devices and transform the data into drainage aid output instructions and defoamer output instructions, which are subsequently delivered to a drainage aid delivery unit and a defoamer delivery unit.

The controller receives data provided by the entrained air measurement device, the brown stock washer drum speed relay, the brown stock washer stock flow rate measuring device, and optionally other data-generating devices (collectively, "the devices"). Each of the devices measures its applicable variable and communicates the measurement in some form to the controller. The controller transforms the data into output instructions (e.g., drainage aid output instructions and defoamer output instructions).

The controller as provided herein refers to an electronic device having components such as a processor, memory device, digital storage medium, cathode ray tube, liquid crystal display, plasma display, touch screen, or other monitor, and/or other components. Controllers include, for example, an interactive interface that guides a user, provides prompts to the user, or provides information to the user regarding any portion of the method of the invention. Such information may include, for example, building of calibration models, data collection of one or more parameters, measurement location(s), management of resulting data sets, etc.

When utilized, the controller is preferably operable for integration and/or communication with one or more application-specific integrated circuits, programs, computer-executable instructions or algorithms, one or more hard-wired devices, wireless devices, and/or one or more mechanical devices such as liquid handlers, hydraulic arms, servos, or other devices. Moreover, the controller is operable to integrate feedback, feed-forward, or predictive loop(s) resulting from, inter alia, the parameters measured by practicing the method(s) of the present disclosure. Some or all of the controller system functions may be at a central location, such as a network server, for communication over a local area network, wide area network, wireless network, extranet, the Internet, microwave link, infrared link, and the like, and any combinations of such links or other suitable links. In addition, other components such as a signal conditioner or system monitor may be included to facilitate signal transmission and signal-processing algorithms.

By way of example, the controller is operable to implement the method of the invention in a semi-automated or fully-automated fashion. In another embodiment, the controller is operable to implement the method in a manual or semi-manual fashion. Examples of the aforementioned variations of the invention are provided herein in reference to the figures.

For example, a dataset collected from brown stock may include variables or system parameters such as entrained air concentration, brown stock washer drum speed, brown stock washer stock flow, and other variables or system parameters described herein (e.g., whether determined empirically, automatically, measured directly, calculated, etc.). Such parameters are typically measured with any type of suitable data measuring/sensing/capturing equipment, such as described herein. Such data capturing equipment is preferably in communication with the controller and, according to alternative embodiments, may have advanced functions (including any part of control algorithms described herein) imparted by the controller.

Data transmission of any of the measured parameters or signals to a user, a drainage aid delivery unit (e.g., a drainage aid delivery pump), a defoamer delivery unit (e.g., a defoamer delivery pump), alarms, or other system components is accomplished using any suitable device, such as a wired or wireless network, cable, digital subscriber line, internet, etc. Any suitable interface standard(s), such as an Ethernet interface, wireless interface (e.g., IEEE 802.11a/b/g/n, 802.16, Bluetooth, optical, infrared, other radiofrequency, any other suitable wireless data transmission method, and any combinations of the foregoing), universal serial bus, telephone network, the like, and combinations of such interfaces/connections may be used. As used herein, the term "network" encompasses all of these data transmission methods. Any of the components, devices, sensors, etc., herein described may be connected to one another and/or the controller using the above-described or other suitable interface or connection. In an embodiment, information (collectively referring to all of the inputs or outputs generated by the method of the invention) is received from the system and archived. In another embodiment, such information is processed according to a timetable or schedule. In a further embodiment, such information is processed in real-time. Such real-time reception may also include, for example, "streaming data" over a computer network. An example of a controller is a 3D TRASAR control unit, available from Nalco Water, 1601 West Diehl Road, Naperville, Ill. 60563.

The controller may be configured to transform the data provided by the brown stock washer drum speed relay and the brown stock washer stock flow rate measuring device according to Formula A described herein. The controller may be configured to transform the data provided by the entrained air measurement device according to Formula B described herein.

In certain embodiments of the systems and methods provided herein, a drainage aid delivery unit is configured to receive and execute the drainage aid output instructions from the controller. An embodiment of a drainage aid delivery unit is a pump, which may be a variable speed pump, arranged and configured to deliver an amount of drainage aid to the brown stock. For example, the drainage aid may be present in a tank, and the drainage aid delivery unit may be arranged and configured to remove drainage aid from the tank via a conduit and deliver the drainage aid to the brown stock. An example of a drainage aid delivery unit is a variable speed diaphragm pump.

In certain embodiments of the systems and methods provided herein, a defoamer delivery unit is configured to receive and execute the defoamer output instructions from the controller. An embodiment of a defoamer delivery unit is a pump, which may be a variable speed pump, arranged and configured to deliver an amount of defoamer to the brown stock. For example, the defoamer may be present in a tank, and the defoamer delivery unit may be arranged and configured to remove defoamer from the tank via a conduit and deliver the defoamer to the brown stock. An example of a defoamer delivery unit is a variable speed diaphragm pump.

The system may further comprise at least one of a vat level detector, a shower flow measurement device, a shower conductivity measurement device, a drum thickener electrical current relay, an entrained air bubble size detector, and combinations thereof, in communication with the controller.

The Example presented herewith is intended to be exemplary in nature and not limiting of the scope of the invention.

EXAMPLE

Figure 2A:
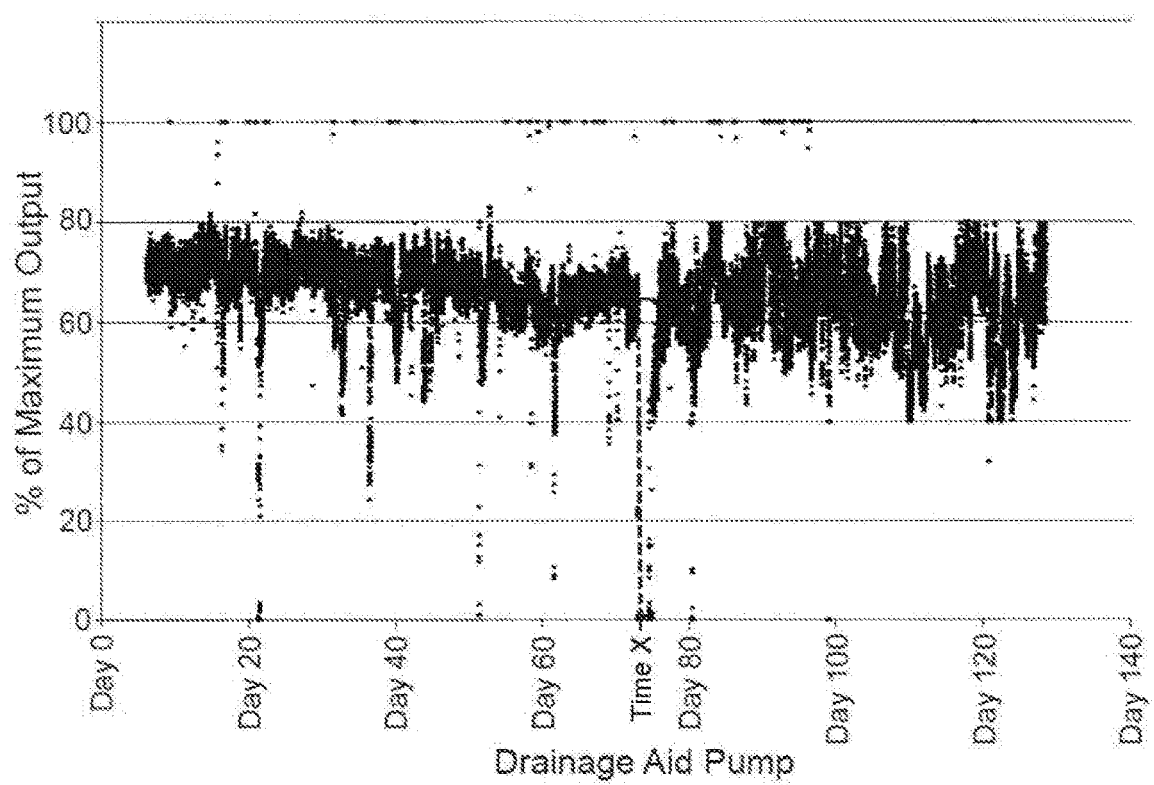
FIGS. 2A and 2B graphically illustrate results obtained in the Example related to drainage aid consumption.
Figure 2B:
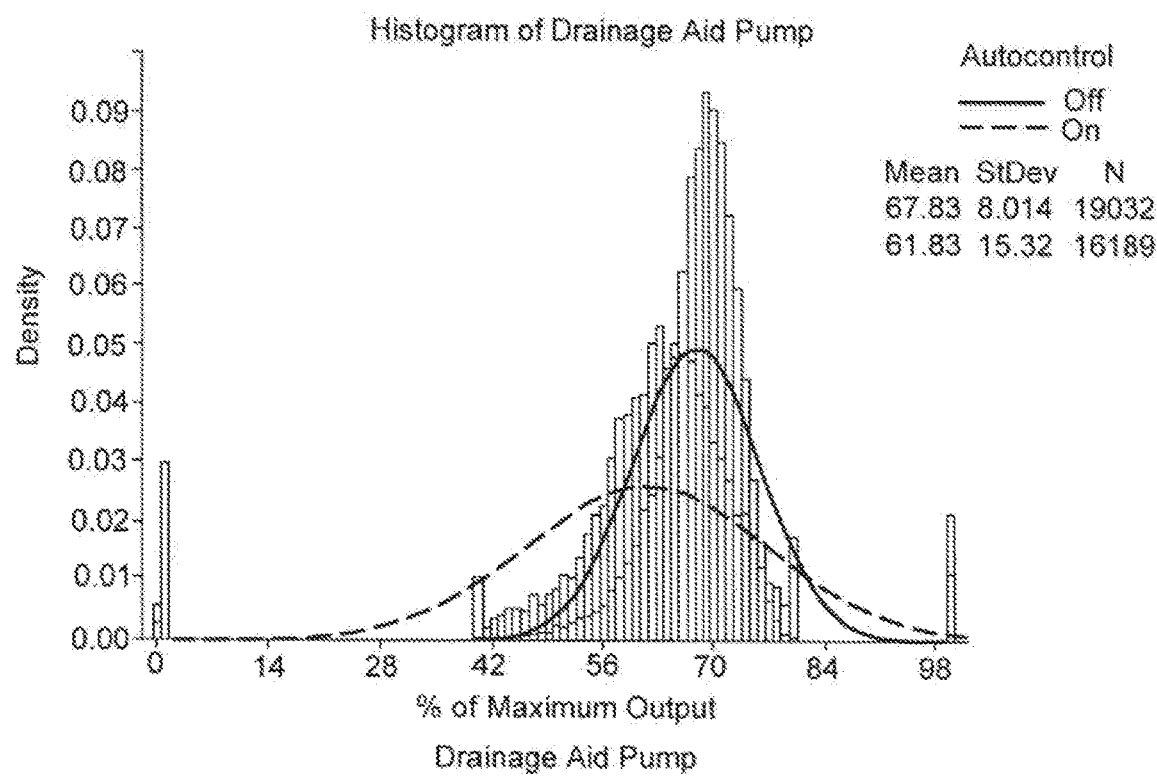
Figure 3A:
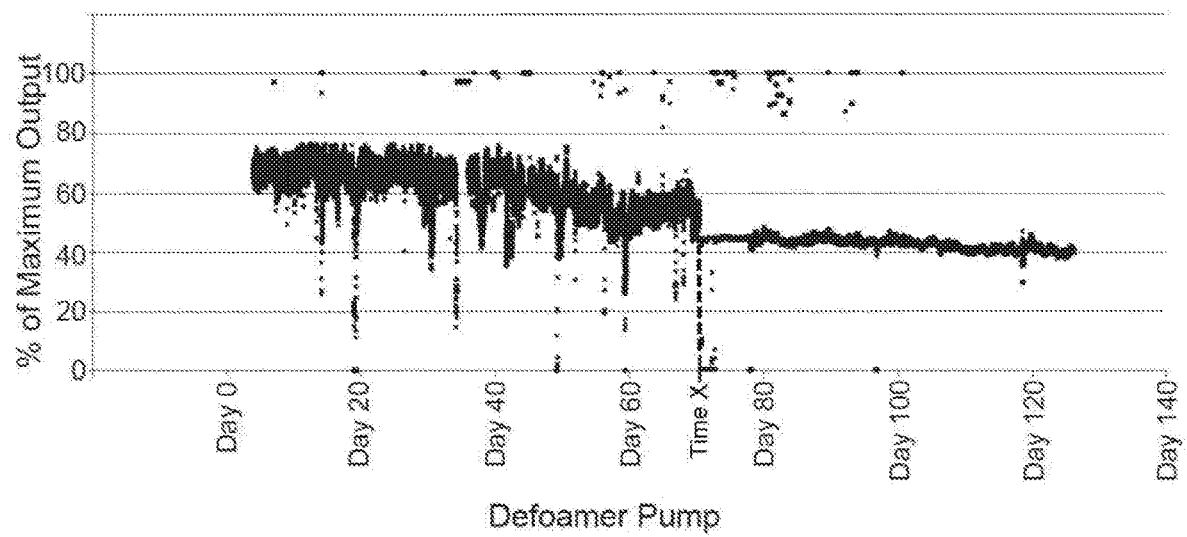
FIGS. 3A and 3B graphically illustrate results obtained in the Example related to defoamer consumption.
Figure 3B:
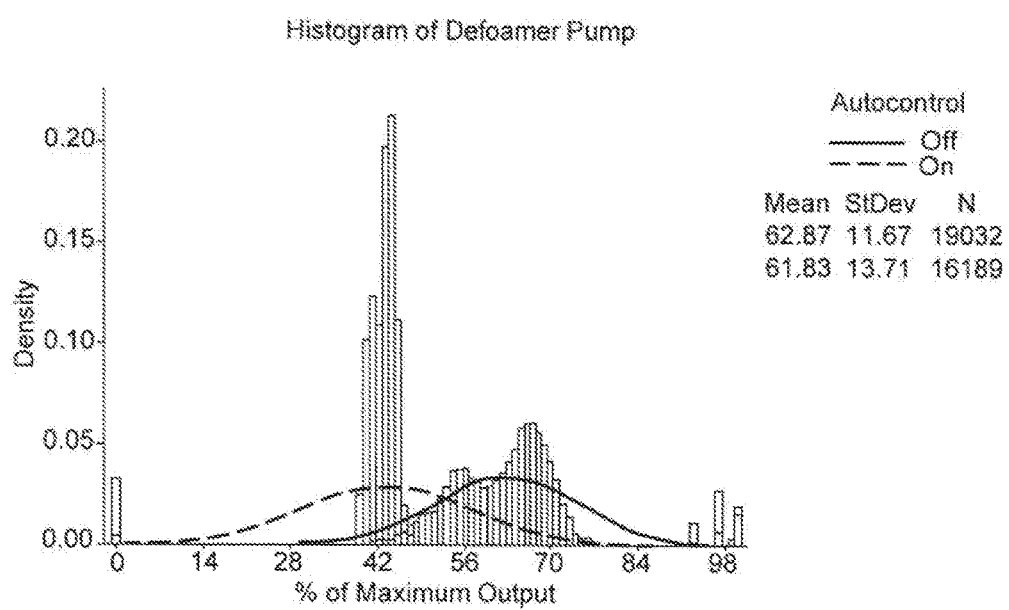

As shown in FIGS. 2 and 3, drainage aid and defoamer were dosed to a brown stock washing process according to a previous dosing regimen. At Time X, dosing of drainage aid and defoamer commenced via the methods described herein, using a system as described herein. In particular, the drainage aid was dosed according to at least two variables: brown stock washer drum speed and brown stock washer stock flow, in this instance Formula A, and the defoamer was dosed according to a comparison of the measured entrained air concentration of the brown stock to a setpoint, in this instance Formula B. Upon implementation of the methods and systems described herein, drainage aid consumption decreased approximately 7% and defoamer consumption decreased approximately 12%. Though the variability of the drainage aid dosage increased (see FIG. 2A), the overall consumption decreased approximately 7% (see FIG. 2B). Because drainage aid dosage was controlled accordingly, defoamer consumption decreased approximately 12% (see FIGS. 3A and 3B).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Ordinal numbers (first, second, third, etc.) are used herein merely for purposes of differentiating certain terms and are not to be construed as limiting of order. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of controlling dosage of drainage aid to brown stock of a brown stock washing process, the method comprising:
    dosing the drainage aid to brown stock according to at least two variables: brown stock washer drum speed and brown stock washer stock flow;
    the drainage aid dosed according to a first comparison of the brown stock washer drum speed to the brown stock washer stock flow;
    wherein the first comparison is performed using a first linear control formula; and
    wherein the first linear control formula is Formula A:

$$dad = m1*\{DS-[(m2*SF)+b2]\}+b1 \qquad \text{Formula A,}$$

wherein dad=drainage aid dosage, m1=a first slope, DS=brown stock washer drum speed, m2=a second slope, SF=brown stock washer stock flow, b1=a first offset, and b2=a second offset.

2. The method of claim 1, further comprising controlling dosage of defoamer to the brown stock of the brown stock washing process, wherein
    the defoamer is dosed to the brown stock according to measured entrained air concentration of the brown stock, the measured entrained air concentration of the brown stock compared to a setpoint and controlled accordingly.

3. The method of claim 2, wherein the defoamer comprises a hydrocarbon, an oil, a fatty alcohol, a fatty ester, a fatty acid, a poly(alkylene oxide), an organic phosphate, hydrophobic silica, a silicone-containing compound, and combinations thereof.

4. A method of controlling dosage of drainage aid and defoamer to brown stock of a brown stock washing process, the method comprising:
    dosing the drainage aid and the defoamer to brown stock according to at least three variables: measured entrained air concentration of the brown stock, brown stock washer drum speed, and brown stock washer stock flow;
    the drainage aid dosed according to a first comparison of the brown stock washer drum speed to the brown stock washer stock flow; and
    the defoamer dosed according to a second comparison of the measured entrained air concentration of the brown stock to a setpoint,
    wherein the first comparison is performed using a first linear control formula; and
    wherein the first linear control formula is Formula A:

$$dad = m1*\{DS-[(m2*SF)+b2]\}+b1 \qquad \text{Formula A,}$$

wherein dad=drainage aid dosage, m1=a first slope, DS=brown stock washer drum speed, m2=a second slope, SF=brown stock washer stock flow, b1=a first offset, and b2=a second offset.

5. The method of claim 4, wherein the defoamer comprises a hydrocarbon, an oil, a fatty alcohol, a fatty ester, a fatty acid, a poly(alkylene oxide), an organic phosphate, hydrophobic silica, a silicone-containing compound, and combinations thereof.

6. The method of claim 5, wherein the defoamer comprises a silicone-containing compound.

7. The method of claim 6, wherein the silicone-containing compound is a polydimethylsiloxane-containing compound.

8. The method of claim 1, wherein the drainage aid comprises a surfactant, a defoamer, a solvent, or combinations thereof.

9. The method of claim 4, wherein the drainage aid and the defoamer are independently dosed to the brown stock washing process according to a further variable selected from vat level, shower flow, shower conductivity, electrical current of the drum thickener, entrained air bubble size, and combinations thereof.

10. The method of claim 4, wherein the second comparison is performed using a second linear control formula.

11. The method of claim 10, wherein the second linear control formula is Formula B:

$$dd = m3*(mEA-sp)+b3 \qquad \text{Formula B,}$$

wherein dd=defoamer dosage, m3=a third slope, mEA=measured entrained air, sp=setpoint, and b3=a third offset.

12. A system for controlling dosing of drainage aid and defoamer to a brown stock washing process, the system comprising:
    an entrained air concentration measurement device;
    a brown stock washer drum speed relay;
    a brown stock washer stock flow rate measuring device;
    a controller configured to receive data provided by the entrained air measurement device, the brown stock washer drum speed relay, and the brown stock washer stock flow rate measuring device and transform the data provided by the brown stock washer drum speed relay and the brown stock washer stock flow rate measuring device according to Formula A into drainage aid output instructions and defoamer output instructions;

$$dad = m1*\{DS-[(m2*SF)+b2]\}+b1 \qquad \text{Formula A,}$$

wherein dad=drainage aid dosage, m1=a first slope, DS=brown stock washer drum speed, m2=a second slope, SF=brown stock washer stock flow, b1=a first offset, and b2=a second offset a drainage aid delivery unit configured to receive and execute the drainage aid output instructions from the controller; and a defoamer delivery unit configured to receive and execute the defoamer output instructions from the controller.

13. The system of claim 12, wherein the controller is configured to transform the data provided by the entrained air measurement device according to Formula B:

$$dd = m3*(mEA-sp)+b3 \qquad \text{Formula B,}$$

wherein dd=defoamer dosage, m3=a third slope, mEA=measured entrained air, sp=setpoint, and b3=a third offset.

14. The system of claim 12, wherein the system further comprises at least one of a vat level detector, a shower flow measurement device, a shower conductivity measurement device, a drum thickener electrical current relay, an entrained air bubble size detector, and combinations thereof, in communication with the controller.

15. The system of claim 12, wherein the entrained air measurement device is operably connected to at least one of an inlet vat header, an inlet vat line, and a front filtrate.

16. The method of claim 4, wherein the drainage aid comprises a surfactant, a defoamer, a solvent, or combinations thereof.

* * * * *

UNITED STATES PATENT AND TRADEMARK OFFICE
CERTIFICATE OF CORRECTION

PATENT NO. : 11,072,890 B2
APPLICATION NO. : 15/854432
DATED : July 27, 2021
INVENTOR(S) : Karry Mackie et al.

Page 1 of 1

It is certified that error appears in the above-identified patent and that said Letters Patent is hereby corrected as shown below:

On the Title Page

Column 2, Line 1, (57) Abstract, after "Methods" delete "of".

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*